United States Patent

Morita

[15] 3,703,940
[45] Nov. 28, 1972

[54] AIR STREAM OIL-INJECTING TYPE OILER

[72] Inventor: Teruo Morita, Saitama-ken, Japan

[73] Assignee: Shoketsu Kinzoku Kogyo Kabushiki Kaisha, Tokyo, Japan

[22] Filed: July 29, 1970

[21] Appl. No.: 59,319

[30] Foreign Application Priority Data

Aug. 1, 1969 Japan.....................44/72682

[52] U.S. Cl..............................184/55 A, 137/205.5
[51] Int. Cl..............................................F16n 7/34
[58] Field of Search........137/525.3, 525.5, 527, 525, 137/205.5; 184/55 A, 56 A

[56] References Cited

UNITED STATES PATENTS

| | | |
|---|---|---|
| 3,540,551 | 11/1970 | Ohsida.......................184/56 |
| 3,295,547 | 1/1967 | Scaramucci........137/525.3 X |
| 3,115,950 | 12/1963 | Malec.......................184/55 A |
| 3,244,257 | 4/1966 | German et al...........184/55 A |
| 3,295,550 | 1/1967 | Scaramucci........137/525.3 X |

FOREIGN PATENTS OR APPLICATIONS

| | | |
|---|---|---|
| 1,119,666 | 6/1956 | France....................137/525.5 |

*Primary Examiner*—Manuel A. Antonakas
*Attorney*—McGlew and Toren

[57] ABSTRACT

An air stream oil injecting device includes a base portion having a bore through which air is adapted to flow, a depending oil reservoir secured to the base portion, and an inverted bell-shaped dropping window, sealingly secured to the base portion, and containing an oil dropping pipe, the interior of the dropping window communicating with the air flow passage through a small hole. The air dropping pipe is in communication with an oil feed pipe in the reservoir. A T-shaped damper, of resilient material, such as rubber or the like, includes a main damper portion normally extending across the air flow passage and having substantially the shape of the latter, this damper portion being integral with a leg portion which closes, from beneath, a relatively large opening in the lower wall of the air flow passage, the leg portion being retained in position by a threaded plug of rubber or the like. This threaded plug contains a spring biased check valve including a ball engaged by the leg portion of the damper, and a branch passage connects an upstream passage of the air flow passage to a space beneath the leg portion of the damper for leakage of air around the ball check valve into the reservoir. The opening in the lower wall of the air passage forms a recess or groove into which the tongue portion of the damper can be deflected by air under pressure, flowing through the air flow passage, to provide a substantially uninterrupted air flow through the air flow passage.

2 Claims, 2 Drawing Figures

PATENTED NOV 28 1972

3,703,940

INVENTOR.
TERUO MORITA
BY
McGlew & Toren
ATTORNEYS

AIR STREAM OIL-INJECTING TYPE OILER

BACKGROUND OF THE INVENTION

Conventional oilers, of the air stream oil injection type, include either a fixed type damper or a variable type damper. Stated briefly, the principle of operation of such dampers is that lubricating oil, in a depending reservoir, is forced upwardly by the pressure difference existing between the upstream and downstream sides of the damper due to the air flow through the oiler. The lubricating oil, thus forced upwardly, is dropped into the air stream from a dropping pipe, and is mixed with the air flow through the oil, the dropped oil entering the airstream through a small diameter hole or aperture in the air flow passage located downstream of the damper. As a result, the dropped oil is conveyed by the oil stream in an atomized condition.

The dampers usually used may be classified into moving valve type dampers, wherein springs are arranged in a branch passage and in a flow passage, butterfly type dampers, wherein an inner shaft is fixed and blades are secured thereon and arranged as movable flaps, horizontally moving valve type dampers, wherein the elasticity of a damper holder is utilized, etc. In all of these dampers, the air pressure, applied to the damper, is concentrated on the elastic or resilient mounting for the damper, or else the air pressure is applied to a certain fixed area of the damper.

In these known dampers, parts required for mounting the damper are positioned in a predetermined air flow passage, so that the dampers have the shortcoming that the air flow rate, under pressure, is sharply reduced.

SUMMARY OF THE INVENTION

The objective of the invention is to improve conventional dampers, used in such oilers, in order to eliminate the drawbacks of known dampers. To this end, the present invention is directed to an oiler, of the air flow oil injecting type, in which a T-shape damper, of elastic material such as synthetic rubber or the like, is installed in an air flow passage.

The automatically variable damper, of elastic material such as synthetic rubber or the like, has a shape conforming generally to the cross-sectional area of the air flow passage, and is installed in the passage to substantially close the passage. The leg portion of the automatically variable damper is supported by an elastic mounting element integral therewith, and also constituted of synthetic rubber or the like. This elastic mounting element is further designed to serve as a check valve retainer.

The lower wall of the air flow passage is formed with an aperture communicating with a downwardly extending threaded boss which has an undercut shoulder adjacent the aperture. The leg portion of the damper seats against this shoulder, with the tongue or main portion of the damper extending upwardly through the aperture into the air flow passage. A threaded plug is received in the boss, and serves as a seat for a spring biased ball check valve whose ball engages the leg portion of the damper. The space between the plug and the leg portion of the damper communicates, through a branch passage, with the air flow passage upstream of the main portion of the damper projecting into the air flow passage. The aperture, in effect, forms a groove or recess into which the tongue portion of the damper can be deflected under air pressure so as to leave the air flow passage substantially completely unobstructed.

It is possible to obtain an air flow from a comparatively small rate up to the maximum rate by automatically changing the effective opening of the air flow passage in dependence on the air flow rate, and in dependence on the inherent stability of the resilient automatically variable damper.

For an understanding of the principles of the invention, reference is made to the following description of a typical embodiment thereof as illustrated in the accompanying drawings.

DESCRIPTION OF A PREFERRED EMBODIMENT

Figure 1:
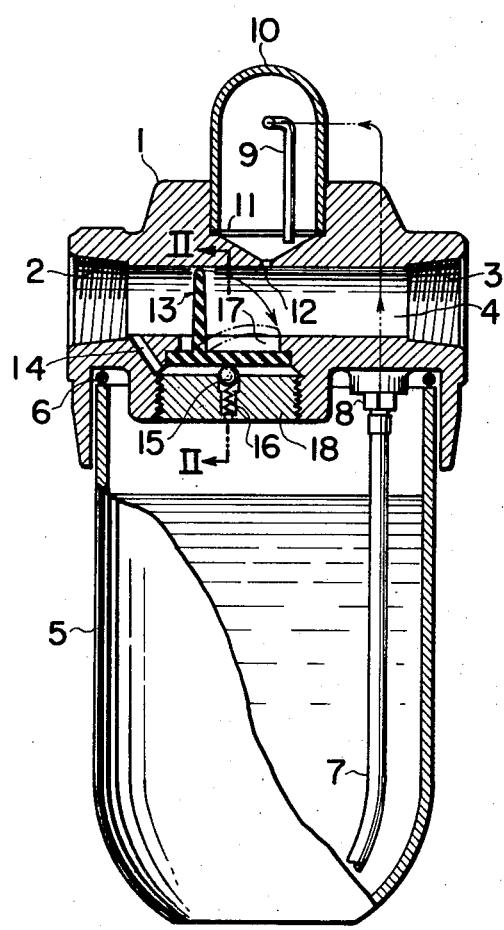
FIG. 1 is a longitudinal sectional view of an air stream oil injecting oiler embodying the invention.

Referring to the drawings, an upper cover or base portion 1 is formed, substantially centrally thereof, with a flow passage or bore 4 having internally threaded portions 2 and 3 at opposite ends thereof for connection of the oiler in a flow circuit. A case or reservoir 5, for storing lubricating oil, is hermetically threaded into upper case 1 with the interposition of a sealing O-ring 6. An oil feed pipe 7 is connected to an oil feed nipple 8, and the interior of feed pipe 7 and nipple 8 forms a passage for lubricating oil whose flow area is adjusted by means of a needle valve which has not been shown.

This oil flow passage 7, 8 is connected to an oil dropping pipe 9 disposed within a bell-shaped dropping window 10 which is hermetically connected to upper cover 1 with the interposition of a sealing packing 11. At the lower end of the dropping window, a small diameter hole or aperture establishes communication between the dropping window 10 and the air flow passage 4.

A T-shape damper 13, embodying the invention, consists of a damping or tongue portion 13a and a leg portion 13b integral with the damping portion. Damper 13 is supported by a rubber damper holder 18 so that damping portion 13a is positioned within air flow bore or passage 4 at a location somewhat upstream, with respect to the direction of air flow, from the small diameter aperture 12. A branch passage or bore 14 communicates with bore 4 further upstream of damper 13, and branch passage 14 is connected to a check ball mechanism including a check ball 15.

When the oil plug (not shown) is removed for replenishing the oil in case 5, the check ball mechanism allows air to flow out of case 5 as the air is displaced by the oil. The check ball mechanism also prevents air under pressure from flowing into case 5 after the oil filling plug is replaced. When the oil filling plug is replaced, the pressure in case 5 is increased due to leakage around check ball 15, which is biased upwardly by a spring 16, and the pressure within case 5 becomes equal to that at the upstream side of bore or passage 4.

When air flows past damper 13, a pressure drop is caused at the downstream side of the damper, and the pressure difference between the air supply pressure and the pressure at aperture 12 provides a pressure difference effective to raise the oil through pipe 7 and nipple 8 into dropping pipe 9, for effecting dropping of lubricating oil into the air flowing through passage 4.

Figure 2:
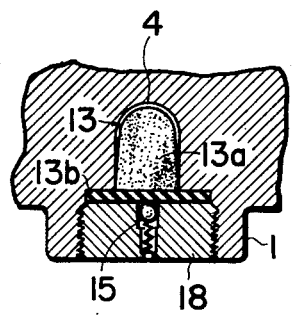
FIG. 2 is a cross-sectional view taken on the line II—II of FIG. 1.

Damper 13 is made of an elastic or resilient material such as synthetic rubber or the like, and is an integral member including the tongue portion 13a and the leg portion 13b. Since tongue portion 13a is deflected or bent about its integral junction with leg portion 13b to be deflected downwardly into the recess or groove 17 in air passage 4 by the flow of air under pressure, passage 4 is opened as the air flow rate is increased, so that a maximum air flow rate can be obtained. The recess 17 is constituted by an aperture in the bottom wall of passage 4 and which is closed by leg portion 13b of damper 13. When the air flow rate is decreased, the flow area through passage 4 is likewise decreased by the resilient return of tongue portion 13a to the position shown in FIG. 1. This is due to the inherent stability of the resilient damper 13 consisting of the tongue 13a which is integral with the leg 13b. When the flow rate is reduced to substantially zero, the clearance between tongue 13a and the wall of passage 4 is very small, as illustrated in FIG. 2, so that dropping of oil is started at a comparatively small flow rate.

As compared to the present invention, conventional oilers of the same type incorporate damper mounting parts or the like which are positioned in the air flow passage, so that the flow rate of air under pressure is sharply decreased. However, the integral T-type resilient damper 13, embodying the invention, is designed so that tongue portion 13a, when deflected, is positioned substantially completely out of the cross-sectional flow area of passage 4, so that a maximum air flow rate can be attained. Additionally, the air pressure on tongue portion 13a is transmitted to leg portion 13b, which does not have any air pressure applied thereto, thus distributing the air pressure equally and avoiding concentration of the air pressure at a particular area of the damper.

In addition, holder 18, which is formed of rubber or other resilient material, serves as a check ball valve retainer, as illustrated in the drawing. Thus, check ball 15 impacts against a resilient damper, thereby preventing permanent set of the check ball holder, such as is inherent in metal retainers for check balls.

While a specific embodiment of the invention has been shown and described in detail to illustrate the application of the principles of the invention, it will be understood that the invention may be embodied otherwise without departing from such principles.

What is claimed is:

1. An air stream oil injecting device comprising, in combination, a base portion having a bore through which air is adapted to flow; means, including an oil reservoir secured to said base portion, operable to drop oil into an air stream flowing through said bore; an aperture formed in the lower wall of said bore and bounded by a downwardly facing shoulder, said aperture defining a recess in the bore surface; a substantially T-shape damper of elastic material, including a leg portion seated against said shoulder and closing said aperture to cooperate therewith to define said recess, and a tongue portion integral with said leg portion and extending therefrom through said aperture into said bore; said tongue portion having substantially the cross-sectional shape of said bore at said aperture; retaining means retaining said leg portion seated against said shoulder; said tongue portion, responsive to increasing flow of air through said bore, bending downwardly toward said leg portion and, with maximum flow of air through said bore, folding down into said recess to leave said bore substantially unobstructed; said tongue portion, responsive to decreased air flow through said bore, returning toward its upright position in accordance with the decrease in the air flow through said bore; said retaining means comprising a threaded plug threaded into a downwardly facing internally threaded boss projecting from said base portion, said plug engaging said leg portion and defining therewith a small volume chamber; a branch passage communicating with said small volume chamber and with said bore upstream of said tongue portion of said damper; and check valve means in said plug controlling communication between said branch passage and the interior of said oil reservoir.

2. An air stream oil injection device, as claimed in claim 1, in which said check valve means comprises a spring biased ball valve in said small volume chamber and controlling communication between said small volume chamber and a passage communicating with said oil reservoir; said ball being engaged with said leg portion of said damper.

* * * * *